United States Patent

Davies

[15] 3,646,528

[45] Feb. 29, 1972

[54] SELF-SEARCHING MEMORY UTILIZING IMPROVED MEMORY ELEMENTS

[72] Inventor: Paul M. Davies, Manhattan Beach, Calif.

[73] Assignee: TRW Inc., Cleveland, Ohio

[22] Filed: Nov. 5, 1964

[21] Appl. No.: 409,127

Related U.S. Application Data

[62] Division of Ser. No. 163,603, Jan. 2, 1962, Pat. No. 3,196,410.

[52] U.S. Cl. ..................340/173.1, 340/173 AM, 340/172.5

[51] Int. Cl. ....................................G11c 15/00, G11c 11/44

[58] Field of Search ................................340/173.1, 173 AM

[56] References Cited

UNITED STATES PATENTS

| | | | |
|---|---|---|---|
| 3,082,408 | 3/1963 | Garwin | 340/173.1 |
| 3,243,785 | 3/1966 | Green | 340/173.1 |
| 3,259,887 | 7/1966 | Garwin | 340/173.1 |
| 3,166,739 | 1/1965 | Haynes | 340/173.1 |
| 3,182,293 | 5/1965 | Fruin et al. | 340/173.1 |
| 3,184,717 | 5/1965 | Behnke | 340/173.1 |

*Primary Examiner*—Terrell W. Fears
*Attorney*—Daniel T. Anderson, Gerald Singer and Alfons Valukonis

[57] ABSTRACT

A superconductive associative memory system using the presence or absence of a persistent current to represent binary information. Readout is accomplished by association in comparators which may be selectively masked.

8 Claims, 8 Drawing Figures

PAUL M. DAVIES
INVENTOR.

BY [signature]
AGENT

PAUL M. DAVIES
INVENTOR.
BY [signature]
AGENT

INVENTOR.
PAUL M. DAVIES
BY [signature]
AGENT

INVENTOR.
PAUL M. DAVIES
BY [signature]
AGENT

SELF-SEARCHING MEMORY UTILIZING IMPROVED MEMORY ELEMENTS

This application is a division of copending application Ser. No. 163,603 filed Jan. 2, 1962, now U.S. Pat. 3,196,410 issued July 20, 1965.

This invention relates to information storage systems and more particularly to a self-searching storage system employing superconductive elements in improved storage circuits.

Information storage systems are well known in connection with electronic computers, data processing systems and the like. Such systems, or more accurately the particular portions thereof in which information storage is effected, are commonly referred to as memories in view of a property they share with the human mind in being able to store representations of particular applied information and to provide signals indicative of particular information upon request. Such memories may be broadly considered to be of two types: those in which information is stored in particular locations within the memory on either a random or an ordered basis and is retrieved by comparing each item stored in the memory with an identification key which is representative of the information that is sought, and those memories in which the storage section is divided into a number of discrete portions each of which bears an address that is used to locate a stored information item upon request. In most memories of the first type mentioned, information searching proceeds on a sequential basis so that on the average there are required half as many comparison operations as there are cells in the memory, thus rendering the retrieval operation both expensive and time consuming. Memory systems of the second general type eliminate the requirement that the entire memory be searched for a particular information item by the use of the memory section address which identifies the particular section of the memory in which an information item is stored. Thus all that is required is a search of the particular section identified by the address. However additional equipment is required in order to store and process the memory section addresses which are associated with the stored information items.

An information storage system which presents the advantages of both of the above-mentioned systems without their inherent disadvantages is disclosed in my copending application entitled "Improvements in Self-Searching Memory Systems," Ser. No. 110,098, filed May 15, 1961, now U.S. Pat. 3,196,407 issued July 20, 1965. This system belongs within the first-mentioned general class but attains a searching speed comparable with that of the second class by providing for a simultaneous comparison of a particular information item identification key with all of the information items stored within the memory. While the system disclosed in the above-mentioned copending application represents a considerable improvement over previously known storage systems, it imposes certain restrictions upon the current amplitudes used.

Accordingly, it is an object of this invention to provide an improved information storage system of the type which permits the retrieval of stored information from a memory upon the application of a single identification key related to a stored information item.

It is a more specific object of this invention to provide an information storage system utilizing superconductor devices of the single control type.

It is a further object of this invention to provide an information storage system having less critical restrictions upon the amplitude of the driving currents applied for operating the system.

A specific object of one particular arrangement of the invention is to permit the retrieval of particular information from the storage circuits of the memory system in a predetermined sequence in response to an applied nonunique identification key.

In general this invention provides a self-searching memory system having storage circuits in which a plurality of single control superconductor devices including a gated persistor circuit are arranged to facilitate the storage and readout of information. Information is stored as either the presence or absence of a circulating current in a gated persistor storage circuit, and the arrangement in accordance with the invention provides for the readout of information from particular storage stages of a selected memory cell in response to an applied identification key. The same storage circuit is applicable both for the storage of information and for the comparison with applied identification signals. Arrangements in accordance with the invention thus permit the readout of selected information in response to an identification key wherein certain of the selection signals have been masked.

In one particular arrangement of the invention, the combination storage and comparison circuit (which may also be designated a memory circuit) is arrayed for use with a sequential readout control circuit so that a plurality of information items which correspond to an applied nonunique identification key may be read out one at a time. In accordance with an aspect of the invention, a particular logic arrangement is employed to provide a comparison between stored information and applied identification keys. During each comparison step, a reset pulse is applied to each memory circuit to direct a control current over a selected path. The individual signals comprising a particular identification key are applied to various gating elements associated with the selected path. The gating elements performs a logical function of comparing individual bits of stored information with the individual identification key signals and serve to block current from the selected path in the event of any mismatch, directing it to an alternate current path. Current remaining in the path containing the gating elements is then detected as an indication of a match in the storage stages associated with that path and is employed to accomplish the readout of the stored information corresponding to the applied key. In accordance with this aspect of the invention, a saving in the number of gating elements is achieved over that required in hitherto known arrangements for performing a similar function.

A better understanding of the invention may be had from a consideration of the following detailed description, taken in conjunction with the accompanying drawings in which.

Figure 1:
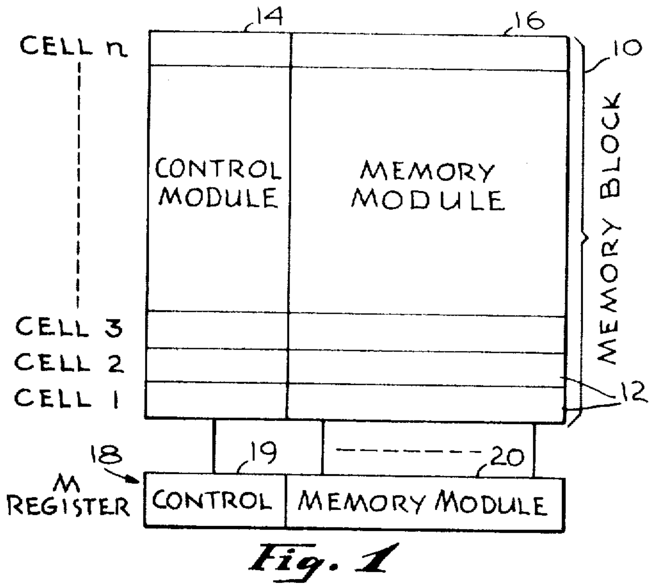
FIG. 1 is a block diagram of one particular information storage system including the present invention.

In order to present a better understanding of the invention, a block diagram will first be discussed which is representative of a particular memory system in accordance with the invention. Referring now to FIG. 1, there is shown a memory block 10 comprising a plurality of individual memory cells such as the cells 12, each having the capacity to store a complete record or individual information item. Each memory cell 12 is divided into two parts which are identified as a control module 14 and a memory module 16. The memory module 16 is the portion of the memory cell 12 within which the information record is actually stored. Each memory module 16 is arranged to provide a comparison between information stored therein and applied identification key signals and also to provide particular output signals indicative of stored information when interrogated during the information retrieval process. Only those cells which provide a true comparison between the information stored therein and the applied identification key are arranged to read out the selected information. The memory module portion 16 of each memory cell 12 comprises a number of storage stages. In general, identification key signals will be applied to only certain ones of the individual storage stages with the result that those remaining stages in the particular cell selected by the identification key are read out after the true comparison is effected.

The control module 14 includes circuitry for providing the desired control of the associated portions of the memory cell 12 including the steps of writing information, reading out information, indicating whether a particular cell 12 is available for information storage, controlling the sequence with which a cell is called upon to read out its stored information, and the like. Cooperating with the memory block 10 as a primary control is a single M register 18. As with the individual memory cells 12, the M Register 18 is divided into a control module 19 and a memory module 20. Each of the control and memory includes modules of the M register 18 is connected to corresponding control and memory modules in the individual memory cells 12 of the memory block 10.

In storing information within the memory block 10, the information item is first stored temporarily in the memory module 20 of the M register 18 and is then applied, together with appropriate control signals from the control module 19, to the memory block 10 where a first available memory cell 12 will be selected to receive the information in a manner which will be described in further detail below. Similarly in selecting information to be read out of particular memory cells 12 of the memory block 10, the identification key information is temporarily stored in the memory module 20 of the M register 18, after which appropriate control signals from the control module 19 are applied to the memory block 10 to select the appropriate memory cell or cells 12 and effect the readout of the desired information.

The memory system described herein possesses the capability of operating in response to masked key information. For example, portions of the key information which are masked will be ignored when being compared with portions of the stored information in the respective memory modules 16 of the individual memory cells 12. Thus a particular identification key which is unique to an individual stored information record may be rendered nonunique and utilized in the selection of a plurality of stored information items of a class containing the uniquely identified information item simply by masking certain portions of the unique identification key. Furthermore, information may be cleared from those memory cells 12 containing information corresponding to a particular identification key simply by the application of a selective control signal from the control module 19 of the M register 18 which operates to change the state of an indicating device for this purpose contained within the individual control modules 14 of the memory cells 12.

It will be seen that the present invention may be employed to advantage in various situations. For example, in connection with the storage of records for a motor vehicle registration office, the individual records may be uniquely defined in terms of license plate number, engine number, body number or name and address of owner; or they may be nonuniquely defined in terms of a portion only of a license plate number, the model and color of an automobile, or the like. In either case it is possible through the practice of the present invention to read out associated information from the memory in response to applied identification key signals which may or may not uniquely identify an individual information item.

The invention will be described in terms of apparatus and circuitry comprising superconductive elements arranged for the storage and control of information. Such elements are particularly suitable for use in the arrangements of the invention in view of their small size and low power requirements and also the high speed with which they may be switched between different storage states.

Before proceeding directly with the description of the remaining figures of the drawings, it may be well to review briefly the principles of operation of superconductive devices in order that the invention may be better understood. In the investigation of the electrical properties of materials at very low temperatures, it has been found that the electrical resistivity of certain materials experiences a discontinuity as the temperature of the material approaches absolute zero (0° Kelvin). In fact, for the materials employed in the devices described in the practice of the instant invention, the electrical resistivity becomes equal to zero below some critical temperature. Such materials have come to be known as superconductors, and the temperature at which the discontinuity in the resistivity curve occurs is known as the transition temperature. Recent developments have made it relatively simple to maintain electrical circuits including superconductive materials below the transition temperatures thereof so that the practical application of superconductive devices in electrical circuits becomes feasible. The peculiar property of superconductors, namely, that the resistance is zero in the superconducting temperature region, makes it possible for individual superconductive devices to be interconnected to perform logical functions in data processing systems and in digital computers. Furthermore, since the devices may be fabricated of extremely thin material layers of the order of a few hundred Angstrom units in thickness, it can be seen that an individual device may be of very small size. In addition, since the device is operated principally in its region of superconductivity, current flowing therein when the element is superconductive dissipates no power. Accordingly, superconductive devices become extremely attractive for use in a complex system, such as a digital computer, wherein extensive circuits involving the interconnection of a large number of such devices may be operated with extremely low power requirements.

It has been found that the transition point, i.e., the point at which a given material changes between superconductive and normally resistive states, is a function of both temperature and applied magnetic field with the transition temperature changing as the applied magnetic field is varied. With a magnetic field applied, the temperature at which superconductivity begins for a given material is lowered, and furthermore this temperature decreases as the intensity of the magnetic field is increased. Therefore it can be seen that a superconductive material may be switched in and out of the superconducting region by maintaining the temperature thereof slightly below the zero magnetic field transition temperature for the material and by varying the applied magnetic field above and below some threshold value applicable for that temperature. This phenomenon suggests that the presence of a current existing in a superconductor may be detected by the application of a particular magnetic field above the threshold value for the temperature at which the superconductor is maintained in order that current flowing therein may produce a voltage drop that can be observed. Thus superconductive devices may be employed to perform a variety of functions required for computer operation as, for example, information storage, circuit current control, and the like.

It should be noted that the flow of electric current within a superconductor itself generates a magnetic field which, when combined with any externally applied magnetic field, determines whether the threshold field value is exceeded. It will be appreciated that the magnetic field arising from the flow of current in one superconductor may be applied to a second superconductor to exceed the threshold field value thereof and thereby cause the second superconductor to switch from a superconductive region to a region of normal electrical resistance. Thus it will be clear that one superconductor device carrying a current of a value sufficient to generate a magnetic field exceeding the threshold value of a second device may be employed to control the resistive state of the second superconductive device.

For the purposes of the present application, the term "superconductive material" will be understood to mean a material which loses all measurable resistance to the flow of electrical current for temperatures below some specified value of critical temperature. A list of a few of these materials and the corresponding transition temperature at which each material changes from a normally resistive state to a superconductive state is given below:

| | |
|---|---|
| Niobium | 8° Kelvin |
| Lead | 7.2° Kelvin |
| Vanadium | 5.1° Kelvin |
| Tantalum | 4.4° Kelvin |
| Mercury | 4.1° Kelvin |
| Tin | 3.7° Kelvin |
| Indium | 3.3° Kelvin |
| Thallium | 2.4° Kelvin |
| Aluminum | 1.2° Kelvin |
| Titanium | 0.5° Kelvin |

In addition to the materials listed above, other elements as well as many alloys and compounds have been found to exhibit superconductive properties at temperatures ranging between 0° and 17° Kelvin. For a more complete discussion of this subject, reference is made to a book entitled "Superconductivity" by D. Schoenberg, Cambridge University Press, Cambridge, England (1952). The above listed transition temperatures apply only when the materials are in a substantially zero magnetic field. In the presence of a magnetic field, the transition temperature is decreased so that a given material may be in an electrically resistive state even for temperatures below the specified transition temperature at which the material would be superconductive in the absence of a magnetic field.

Inasmuch as a magnetic field may arise from a current flowing within a superconducting element, the element may be considered to have a critical value of electrical current as well as a critical value of magnetic field which will cause the element to switch from a condition of superconductivity to an electrically resistive condition. Accordingly, when an element is held at a temperature below the normal transition temperature thereof for a zero magnetic field, the superconducting condition of the element may be extinguished by the application of a magnetic field which may originate from an external source or may be internally generated through the flow of current within the element.

Figure 2:
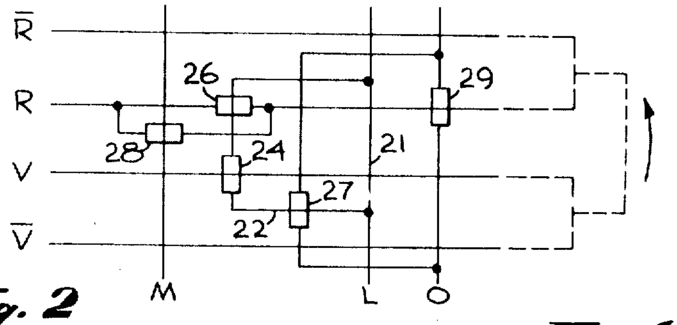
FIG. 2 is a schematic representation of a combination storage and comparison circuit in accordance with the invention for use in the system of FIG. 1.

Referring now to FIG. 2, a combination storage and comparison circuit in accordance with the invention and utilizing a plurality of cryogenic elements exhibiting the characteristics just discussed will be described. The basic storage circuit in the arrangement of FIG. 2 is a superconductive device known as a gated persistor comprising the two parallel paths 21 and 22 and having a gate element 24 in series with the path 22. Together the paths 21 and 22 comprise a closed loop for current flow which may be maintained in the superconducting condition. Thus once established in this closed loop, a circulating current continues to flow undiminished for an indefinite period. Such a current can be initiated or terminated in accordance with applied information signals so that the current may be employed to represent stored information in binary code. Although both of the paths 21 and 22 may contain a certain amount of inductance, the persistor loop can be more easily understood if the path 21 is thought of as the inductive branch and the path 22 is considered either superconductive or resistive by virtue of the gate element 24 which is controlled by current in the V lead.

In this arrangement of the invention, a binary 1 is represented by a circulating current in the persistor whereas a binary 0 is represented by the absence of current therein. A binary 1 may be stored by the application of a writing current to the lead L. While the current direction is immaterial, let it be assumed that the writing current for a binary 1 is directed upwardly in the L lead. In the particular memory cell in which information is to be written, a control current is concurrently applied to the V lead, thus rendering the superconductive element 24 resistive. In those storage circuits which do not experience a control current in the V lead, current in the L lead divides between the paths 21 and 22 in inverse relationship to the respective inductances thereof; when the current in the L lead is terminated, the corresponding currents in the paths 21 and 22 also terminate. However, in those circuits in which the path 22 is rendered resistive by virtue of a control current in the V lead connected to the gate element 24, the current from the L lead is directed along the path 21. Prior to the termination of the writing current in the L lead, the control current is diverted from the V lead to the $\bar{V}$ lead, thus permitting the element 24 to become superconductive again. Upon the termination of the writing current applied to the L lead, the inductance of the path 21 maintains a particular level of current which is directed to flow around the superconducting loop comprising the paths 21 and 22.

The dashed lines at the right hand side of FIG. 2 are used to indicate that the V and $\bar{V}$ leads are connected in parallel and that current over one or the other of these leads is returned over the parallel combination of the R and $\bar{R}$ leads. The return current is caused to flow over the R lead by an associated control circuit (to be described later) unless it is blocked by the resistive states of elements such as 26 and 28. During the writing process, current is directed from the associated control circuit to the V lead. During other operations, such as the comparison and readout processes, the current is directed to the $\bar{V}$ lead. It has already been mentioned that the circuit shown in FIG. 2 is employed as a bit storage stage in the memory module of a memory cell and is arranged to function both as a comparison circuit in response to key identification signals from the M register and as a readout stage to return to the M register an indication of the information storage state of the circuit.

During the comparison of stored information with identification signals from the M register, the identification signals are applied to selected ones of the L leads. During this process, the gate 26 is to be rendered resistive only if the particular information bit stored in the associated persistor does not match the information signal transmitted via the L lead. A binary 1 is represented by a current in the L lead in the same direction as in writing whereas a binary 0 is represented by the absence of current in the L lead. The following Table I shows four possible states of the circulating persistor current, $I_p$, the transmitted current on the L lead, $I_L$, and the resulting current, $I_r$, in the path 22 of the persistor circuit.

| $I_p$ | $I_L$ | $I_r$ |
|---|---|---|
| 0 | 0 | 0 |
| 0 | 1 | 1 |
| 1 | 0 | 1 |
| 1 | 1 | 0 |

TABLE I

In order for the device to operate as indicated by Table I, the inductance of the paths 21 and 22 and the magnitude of the circulating current $I_p$ are arranged to be such that the portion of the current $I_L$ which is directed through the path 22 is equal in magnitude to $I_p$. These two currents are, however, oppositely directed in the path 22 so that in effect they cancel each other out. This provides the corresponding values of the current $I_r$ shown in Table I with the result that the gate 26 is resistive only in the case of a mismatch between the transmitted and stored information states.

The resulting current $I_r$ in the path 22 determines whether or not the device 26 is rendered resistive. Simultaneously with the application of the identification current to the L lead, a comparison control signal is also applied to the M lead for those bit stages in which the information is to be compared with the identification signals. Thus the device 28 of these stages is also rendered resistive so that current is blocked from the R lead in those memory cells where a mismatch with the applied identification signals is evidenced by the device 26 being resistive. Only where a match between stored information and the applied identification signals exits will all the devices 26 be superconductive so that current flows in the R lead. This current in the R lead renders the device 29 resistive so that an appropriate indication may be given in response to a readout current subsequently applied to the 0 lead.

The readout indication is obtained by recognizing either the resistive or superconductive state of the 0 lead. As mentioned above the gate 29 will be resistive in only the selected cell which has current in the R lead. The resistive condition of the gate 27 will be determined by the information stored in the persistor loop circuit. By our convention, a binary 1 is represented by a circulating current sufficient to cause the gate 27 to be resistive. Conversely, a binary 0 corresponds to an absence of a persistor current which thereby allows the gate 27 to remain superconductive. The readout operation on the 0 lead is therefore determined by the information contained in the persistor circuit of the selected cell.

It has been previously mentioned that the arrangements of the present invention are readily adapted to the masking of selected identification signals. Such masking is accomplished by failing to apply a comparison control current on those M leads connected to stages which are to be masked. As a result, the associated device 28 is maintained superconductive so that no resistance is introduced in the R lead by stages which are masked, regardless of whether the information which is contained therein happens to match the identification key signals applied to the L leads.

When masking of particular portions of an identification key is to be accomplished in this manner, it may be desirable to employ a particular sequence in the application of the signals applied to the M and L leads with respect to the signal which is used to reset the control currents and which will be described in further detail in connection with FIG. 4. It may be mentioned here that this reset signal is employed to switch current from the $\bar{R}$ lead to the R lead prior to every readout operation. Without the particular sequence of application of these signals, a situation may arise in those stages where a masked storage bit contains a zero such that the R lead current divides between the devices 26 and 28, neither of which is resistive. If a current is thereafter transmitted along the L lead, the device 26 is driven resistive and, because of the finite inductance of the circuit, a voltage is developed across the device 26. The combined effect of such voltages in a significant number of masked bit stages of a single memory cell could cause a substantial and erroneous reduction of the current in the R lead. This situation is avoided by applying the M, L, and reset signals in a proper sequence with the reset signal being applied after the M and L lead signals are initiated and terminated before the currents in the M and L leads are terminated. Thus current is first transmitted via the appropriate M and L leads; i.e., in those L leads where the transmitted identification key signals correspond to a binary 1 and in those M leads where no masking is desired. Next the reset signal is applied which tends to switch current from the $\bar{R}$ lead to the R lead. This will be opposed by resistance in every R lead except the one with a matching key, so that after the reset pulse is terminated, all R lead currents will decay to zero, except in the memory cells providing a match with the applied key. This current is then used to read out information from the selected cells.

Figure 3:
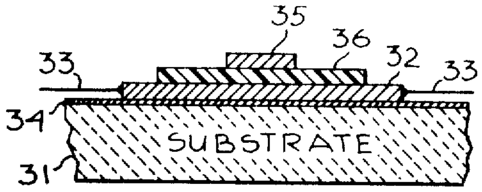
FIG. 3 is a cross-sectional view of a superconductor control element employed in the present invention.

Throughout the circuits of this invention, it will be noted that superconductive devices are employed which have a single gate element associated with a single control element. This represents an improvement over prior arrangements which, in part at least, have required the use of some superconductive devices having more than one control element. A cross-sectional view of a superconductive device which may be employed to advantage in the circuits of this invention is depicted in FIG. 3, showing a substrate 31 to which is affixed a superconductive layer 32. The substrate 31 may be of glass or any other suitable insulator appropriate for this purpose. A superconductive ground-plane 34 may be located between the substrate 31 and the layer 32, and suitably insulated therefrom, for lowering the inductance of the circuits. The superconductive layer 32 is shown with leads 33 attached to opposite ends thereof and may be considered the gate element of the device. A second superconductive layer 35 serving as a control element is deposited over the layer 32 at substantially right angles and is separated therefrom by a thin layer of insulation 36. It will be understood that these layers are very thin, of the order of a few hundred Angstrom units in thickness, so than an individual fabricated device is very small in size. The relative dimensions of the cross-sectional representation of FIG. 3 are not to be taken as determinative of the actual dimensions of a particular device. Because of their very small size, a large number of these devices can be fabricated within a small space and operated at relatively low current levels by virtue of which magnetic fields from current in the control portion 35 may exert the desired influence on the condition of the superconductive layer 32 in order to switch it to the resistive state as desired.

Figure 4:
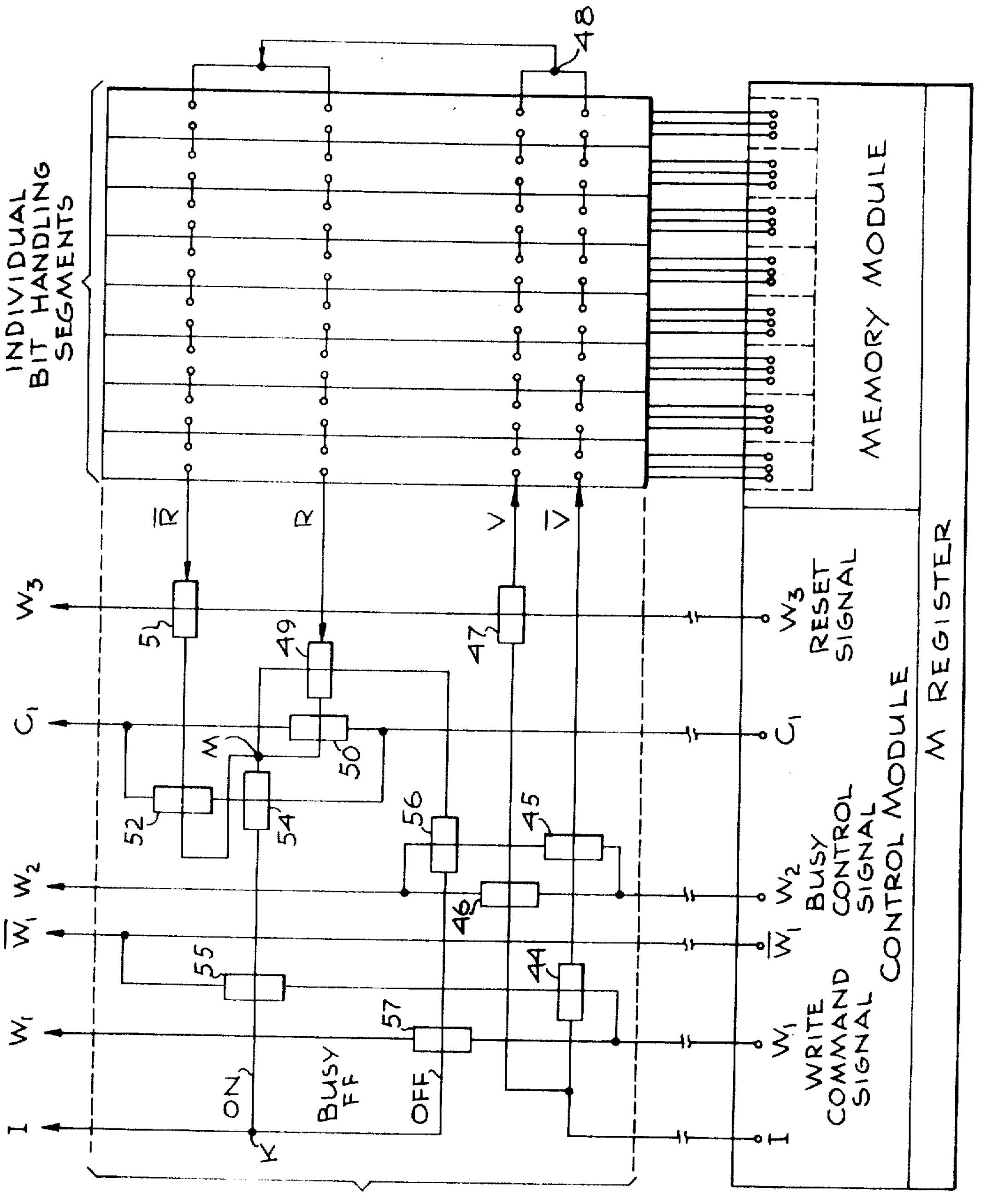
FIG. 4 is a schematic representation of a control circuit employed in the system of FIG. 1.

Reference is now made to the diagram of FIG. 4 in order to explain the control portion of an individual memory cell of the memory block 10 of FIG. 1. FIG. 4 represents an individual memory cell together with the connections to the associated M register. The control portion of the memory cell is represented schematically while the block corresponding to the individual bit handling segments may be understood to contain particular information storage circuits as were discussed in connection with FIG 2, for example.

In the circuit of FIG. 4, current is continuously applied to the I lead from the control module of the M register. As this current proceeds through the memory cell it is directed to either the V or $\bar{V}$ leads, which are in parallel to the node 48 after which it flows in either the R or $\bar{R}$ leads, which are also in parallel with each other, to the point M. From the point M there are again two parallel paths, the ON lead and the OFF lead of a circuit which will be designated the BUSY flip-flop. These parallel leads are joined again at the point K from which current flows in the I lead to the next memory cell. The BUSY flip-flop is used to provide an indication of the storage state of the associated memory module. Current in the ON lead indicates that information is stored in the associated memory module while current in the OFF lead indicates that the associated memory module is available for the storage of information. In addition to the current in the I lead from the M register, control signals in the form of pulses may be applied to the $W_1$, $W_2$, $C_1$ and $W_3$ leads as will be described. It should be remembered that the signal current in the $W_3$ lead is a reset signal and will be applied during each comparison operation in the manner described above in preparation for writing, readout or clearing of information from the respective memory cells. A reset current applied to the $W_3$ lead drives the devices 47 and 51 to the resistive state. Thus during each reset signal, current is blocked from the V lead connected to the device 47 and from the $\bar{R}$ lead connected to the device 51.

In considering the sequence of operations of the circuit of FIG. 4, it may be borne in mind that the corresponding pairs of leads V and $\bar{V}$, R and $\bar{R}$, are separately concerned with the steps of writing, selecting and reading information in appropriate memory cells. Thus only one pair of leads need be considered for a given control operation. In the writing operation, a particular memory cell will be selected only if the corresponding BUSY flip-flop is in the OFF condition and if that cell happens to be the closest available memory cell to the M register. For purposes of explanation, let it be assumed that the memory cell shown in FIG. 4 corresponds to these particular conditions.

A write command signal current applied to the $W_1$ lead flows toward the memory cell of FIG. 4 where it is presented with two possible paths. In those memory cells where the BUSY flip-flop is in the ON condition, the device 55 is rendered resistive and blocks the current in the $W_1$ lead from flowing to the $\overline{W_1}$ lead. However, in the memory cell of FIG. 4, which represents the first available memory cell, the BUSY flip-flop is in the OFF state so that current in the OFF lead drives the device 57 resistive, thus directing current to flow from the $W_1$ lead through the control element of the device 44 and through the device 55 to the $\overline{W_1}$ lead. This drives the device 44 resistive and switches current from the $\overline{V}$ to the V lead in order to effect the writing of the information applied from the memory module of the M register into the information storage circuits of the individual bit handling stages in accordance with the process already described with reference to FIG. 2.

Immediately following the write command signal in the $W_1$ lead, a busy control signal is applied to the $W_2$ lead. This current encounters the device 46 in a resistive state as the result of current flowing through the control lead thereof via the V lead. In consequence, the busy control signal current in the $W_2$ lead is directed through the gating element of device 45 and the control element of the device 56, rendering the gating element of the latter resistive. This switches current in the BUSY flip-flop from the OFF to the ON lead in order to provide the appropriate indication to subsequent control pulses that the particular memory cell is no longer available for information storage. In those cells which do not have current flowing in the V lead, the busy control signal is blocked by the resistive state of the device 45, rendered resistive by a current on the $\overline{V}$ lead, so that the busy control signal flows through the device 46 and bypasses the device 56.

The control of current in the R and $\overline{R}$ leads during the memory cell selection and readout processes in response to identification key signals applied from the memory module of the M register has already been described in connection with FIG. 2. Particular memory cells are selected in exactly the same way when it is desired to clear such cells of obsolete or possibly erroneous information by changing the associated BUSY flip-flop from ON to OFF. Any number of such cells may be selected by the application of an identification key from the M register memory module, after which a clear command pulse is applied to the $C_1$ lead from the control module of the M register. In those cells which are not selected, current in the $\overline{R}$ lead renders the device 52 resistive while the device 50 is superconductive so that a clear command pulse passes through the device 50 without producing any effect. However, in those cells which are selected in response to the identification key from the M register memory module, current in the R lead renders the device 50 resistive so that the clear command pulse is directed through the gate element of the device 52 and the control element of the device 54. This drives the device 54 resistive and switches current from the ON lead to the OFF lead of the BUSY flip-flop so that thereafter this memory cell will provide an OFF response in the BUSY flip-Flop, thereby indicating that the associated memory module is available for storage. It will be clear that the writing control current applied to the V lead automatically destroys the previous information state of the storage circuits while enabling new information to be written therein.

The device 49 is included in series with the R lead to block current therein for those memory cells exhibiting an OFF indication of the BUSY flip-flop, thus preventing an erroneous output from a cell having a BUSY flip-flop in the OFF condition but which may possibly still contain obsolete information corresponding to a particular applied identification key.

The advantages provided by one particular aspect of the invention may be appreciated from a consideration of FIG. 2 and 4. As indicated, the R and $\overline{R}$ leads are alternate paths for a current which serves to indicate whether or not a particular memory cell is selected for readout. The indication depends on the outcome of the comparison operation performed in each stage of the memory module to which an unmasked identification signal is applied. Previously known arrangements for providing a yes-no output signal on the basis of applied input signals have generally depended on a pair of gating devices in each comparison stage. It will be noted, however, that the present invention accomplishes the desired result through the utilization of a single gating element in each stage in conjunction with a resetting gate in series with the $\overline{R}$ lead. Each individual memory circuit (FIG. 2) contains a single gating device 26 for performing the logical function of comparing the stored information with the applied identification key signal. (The device 28 is not utilized in the comparison function but is rather employed to enable a masking signal to override the comparison result.) As described above, the application of a reset signal to the device 51 (see FIG. 4; one such device per memory cell) together with the application of identification key signals to the devices 26 in the individual stages advantageously serves to develop the appropriate indication of a comparison with a saving of nearly 50 percent of the number of individual devices employed for a similar purpose in previously known arrangements.

Figure 5:
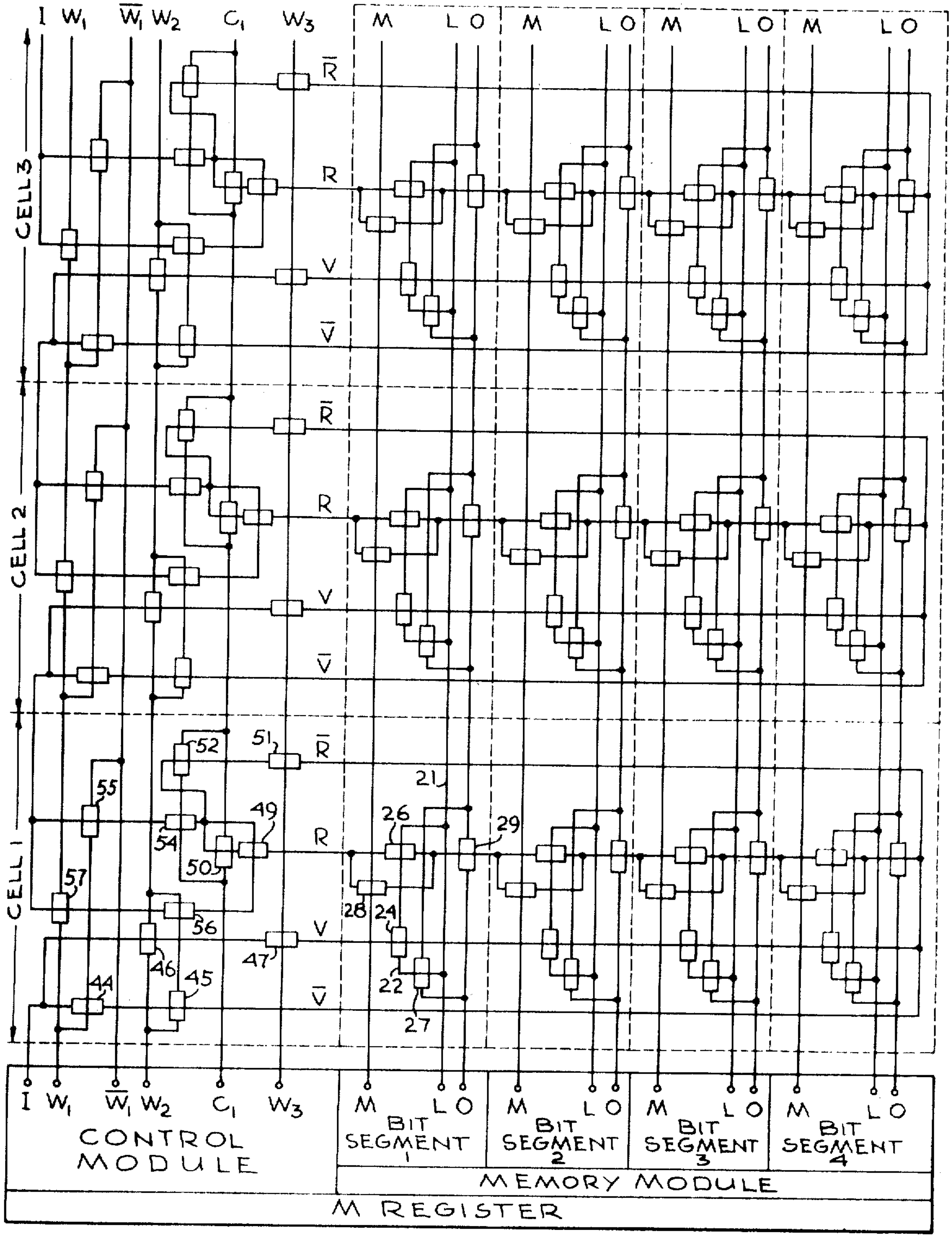
FIG. 5 is a schematic representation of a portion of the information storage system of FIG. 1.

FIG. 5 is a schematic representation of a portion of the memory system of FIG. 1 showing a plurality of individual comparison and storage circuits similar to that of FIG. 2 in conjunction with control circuits as shown in FIG. 4 for three different memory cells. The operation of this circuit can readily be understood from the description of the circuits of FIGS. 2 and 4. While the circuit of FIG. 5 is shown with only four individual bit handling stages in each memory cell, it will be understood that the memory cells may be readily extended to whatever capacity is desired simply by adding additional bit stages in series with those already shown. Similarly the circuit of FIG. 5 may be expanded to include a larger number of memory cells by adding additional cells to those shown.

Figure 6:
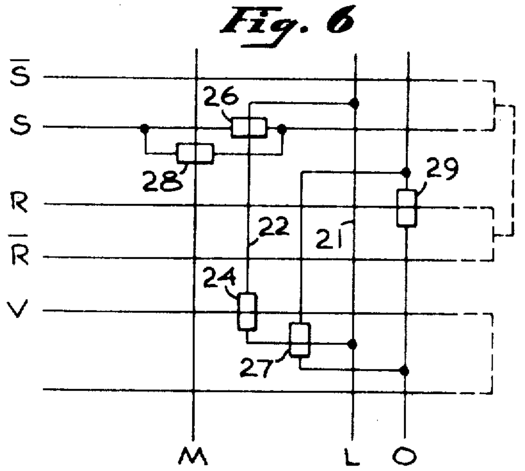
FIG. 6 is a schematic representation of another particular arrangement of a combination comparison and storage circuit connected to permit sequential readout of stored information.

A second particular arrangement of a combination comparison and storage circuit in accordance with the invention is shown in FIG. 6. FIG. 6 shows the individual superconductive devices of FIG. 2 arranged so that as to permit the sequential readout of a plurality of memory cells in succession. In the circuit of FIG. 6 the superconductive devices are arranged in similar fashion to the arrangement of FIG. 2 with the exception that the devices 26 and 28 are connected in series with an S lead which serves to provide the desired selection of a particular memory cell for readout in response to an applied identification key.

Figure 7:
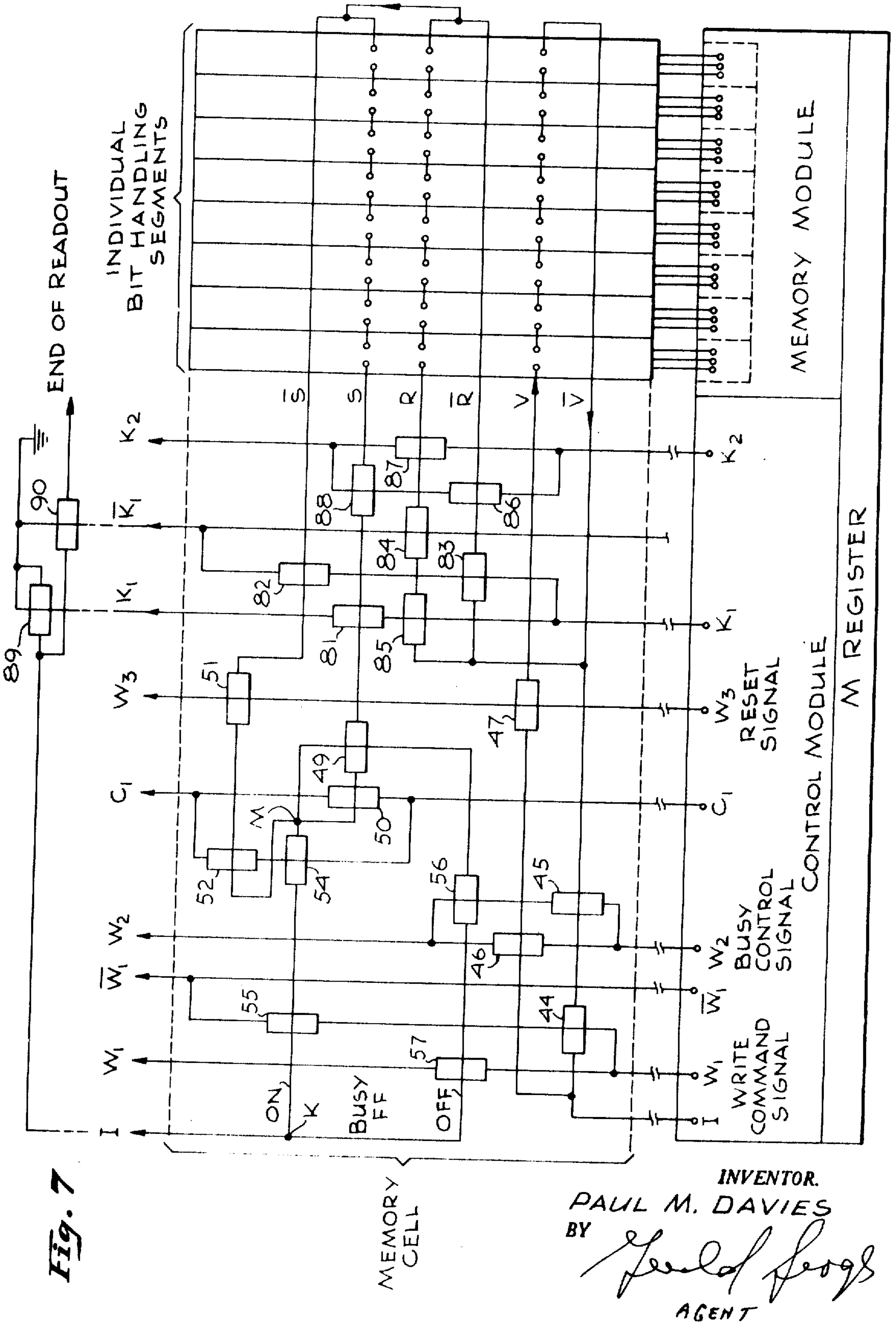
FIG. 7 is a combination schematic and block diagram showing a control circuit for the storage and sequential readout of information.

Circuits such as that shown in FIG. 6 may be employed in the individual bit handling stages of the arrangement of FIG. 7 which is similar to the arrangement shown in FIG. 4 with the addition of control circuitry for achieving sequential readout of selected memory cells. To control the operation of the sequential readout circuit, pulses are applied alternately to the $K_1$ and $K_2$ leads from the control module of the M register. The process for writing information into the individual bit handling segments is the same for the circuit of FIG. 7 as for that shown in FIG. 4 and therefore need not be discussed further. During readout, however, a number of memory cells may be selected in response to the application of a nonunique identification key from the memory module portion of the M register. In the selected cells, current flows in the S lead while in the unselected cells it flows in the $\overline{S}$ lead. Therefore, a first pulse applied on the $K_1$ lead encounters a resistive condition in the device 81 of the selected memory cell nearest the M register. This memory cell will then be the first one to be read out in response to the sequential control signals. Current on the $K_1$ lead, blocked by the device 81, is directed through the device 82 and the control element of the device 83 to the $\overline{K_1}$ lead which serves as a return path for such current. For those cells following the nearest selected cell, current flows in the $\overline{K_1}$ lead and renders the device 84 resistive. For those cells which are nearer the M register than the first selected cell, current flows in the $K_1$ lead to drive the device 85 resistive. Therefore in all of the memory cells except the nearest selected cell, current is blocked from the R lead and is caused to flow in the $\overline{R}$ lead, thus preventing the readout of information from such cells. On the other hand, in the nearest selected cell, the device 83 is rendered resistive while the devices 84 and 85 are superconductive so that current is caused to flow in the R lead, thus providing for the readout of information from this particular cell. Following the application of a signal on the $K_1$ lead, a current pulse is applied to the $K_2$ lead which encounters a resistive device 86 in all cells except the nearest one selected for readout. In the nearest selected cell the current in the $K_2$ lead is blocked by the resistive condition of the device 87 and is caused to flow through the device 86 and through the control element of the device 88. This renders the device 88 resistive and causes the current to switch from the S lead to the $\bar{S}$ lead, thus rendering the device 82 resistive so that the succeeding pulse on the $K_1$ lead is directed through the memory cell which has just been read out and is passed on to the next selected memory cell. There the cycle of operations is repeated and the sequential readout of information from succeeding selected cells proceeds until the last one has been read out.

Near the top of FIG. 7 a pair of devices 89 and 90 are shown arranged in a circuit to provide an indication when the selected circuits have been read out. So long as signals are received by this circuit over the $\overline{K_1}$ lead, which is the case when additional selected circuits remain to be read out, the device 90 is rendered resistive, thus blocking any current in the end-of-readout lead. When the last selected cell has been read out, however, the succeeding $K_1$ signal is passed to the end-of-readout circuit via the $K_1$ lead and drives the device 89 resistive while the device 90 is permitted to become superconductive. Current in the I lead is thus directed to the end-of-readout lead in order to signify that the readout sequence has been completed. It will be clear from a comparison of the circuits of FIGS. 7 and 4 that a plurality of memory cells such as that shown in FIG. 7 may be assembled in the manner of the arrangement of FIG. 5 in order to provide an information storage system of whatever capacity may be desired with the capability of sequential readout of selected information.

Figure 8:
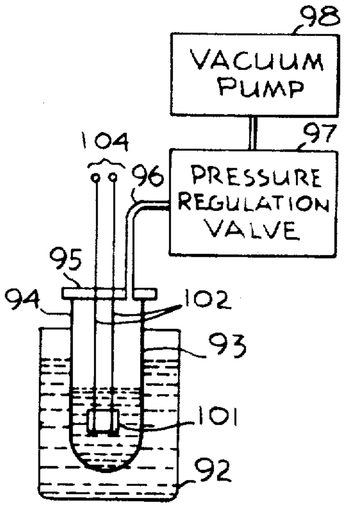
FIG. 8 is a diagrammatic representation of one suitable apparatus which may be employed for maintaining superconductive structures employed in the practice of the invention at a proper temperature of operation.

FIG. 8 is a diagrammatic illustration of an arrangement for maintaining the circuits of the present invention at a suitable low temperature near absolute zero to utilize the property of superconductivity. In FIG. 8 there is shown an exterior insulated container 92 which is adapted to hold a coolant such as liquid nitrogen. Within the container 92 an inner insulated container 93 is suspended for holding a second coolant, such as liquid helium, which maintains the circuits of the invention at the proper operating temperature. The top of the inner container 93 may be sealed by a sleeve 94 and lid 95 through which a conduit 96 connects the inner chamber 93 with a vacuum pump 98 via a pressure regulation valve 97. The pump 98 functions to lower the atmospheric pressure within the chamber so as to control the temperature of the helium. The pressure regulation valve 97 functions to regulate the pressure within the chamber so that the temperature is held constant at a suitable low level. One or more circuits of the invention represented by the block 101 may be suspended in the liquid helium at the proper operating temperature in which the circuit components are superconducting. Connection to the circuits 101 may be made by lead-in wires such as 102 which also may be constructed of a superconductive material to minimize resistance. The lead-in wires 102 are shown extending through the lid 95 to a set of terminals 104.

By means of the invention, electrical circuits are provided of relatively small size which are capable of producing an instantaneous voltage or a plurality of voltages representing the storage of particular information. In accordance with the invention, the storage circuits shown are arranged to utilize simple control elements of small size and are arranged to function in improved fashion in response to applied control signals. Because of the small size and low power requirements of the circuits employed in the described arrangement, a large number of individual circuits may be grouped together to provide a memory system of extremely high capacity and high density for processing information therein. So long as the circuits of the invention are maintained at the proper temperature information may be stored substantially indefinitely and may be read out repeatedly without requiring a regeneration of the information and without dissipation of electrical power within the storage circuits. In addition, due to the simplicity of construction of the circuits of the invention, a high reliability may be achieved.

Although exemplary embodiments of the invention have been illustrated and described herein above, it will be understood that the invention is not limited thereto. Accordingly, the accompanying claims are intended to include all equivalent arrangements falling within the scope of the invention.

The embodiments of the invention in which an exclusive property or privilege is claimed are defined as follows:

1. An associative memory system comprising a plurality of memory cells, each cell being divided into a control module and a memory module, the memory module inclu;ing a combined storage and comparison circuit for storing binary coded information in the form of the presence or absence of a circulating current and for comparing the stored information state with applied identification key signals, means for applying identification key signals to all of said memory cells simultaneously, means for comparing the information content in said memory cells with said identification key signals, to identify all cells exhibiting a true comparison with said identification key signals, and means for reading the information from the identified cells.

2. The invention according to claim 1 and further including an M register for transmitting said identification key signals to said memory cells.

3. The invention according to claim 2 wherein said identification key signals are applied from said M register according to a nonunique key.

4. The invention according to claim 3 and further including means for applying less than all the key signal bits contained in a unique key to render the transmitted key nonunique; and means for sequentially reading the information in the cells that are identified as nonunique.

5. The invention according to claim 4 and further including means for applying a signal concurrently with said identification key signals to designate those cells in which a comparison is to be effected.

6. The invention according to claim 1, wherein each cell includes a plurality of information storage stages, and further including means for storing binary coded information in the respective storage stages of a cell, means in each cell including a pair of alternate current paths for indicating the selection of a particular memory cell, means in each stage of a cell along a first path of said pair for blocking current therefrom in accordance with a predetermined logic function, a single means along the second path of said pair for directing current in said first path during the performance of said logic function, and means for reading out information from a selected memory cell in response to current in said first path.

7. The invention according to claim 1, wherein each cell includes a plurality of information storage stages, and further including means for storing binary coded information in the respective storage stages of a cell, means in each cell including a pair of alternate current paths for indicating the selection of a particular memory cell, means in each stage of a cell along a first path of said pair for blocking current therefrom in accordance with a predetermined logic function, a single means along the second path of said pair for directing current in said first path during the performance of said logic function, means responsive to current in the first path for selecting a corresponding cell, and means responsive to current in the second path for preventing the selection of a corresponding cell.

8. An associative memory system comprising a plurality of memory cells, each cell containing a plurality of superconductive devices distributed in a memory module portion and a control module portion of the cell, those devices in the memory module portion being arranged in stages to store binary coded information in the form of the presence or absence of a circulating current, those devices in the control module portion of a memory cell being interconnected to control the storage and readout of information in the associated memory module portion, means for writing binary coded information into predetermined ones of said memory cells, means for ap-plying identification key signals to all of said memory cells simultaneously, means for selectively applying comparison control signals to respective memory module stages, means within each of said memory cells for comparing the applied identification key signals with the stored information in certain of its stages while comparison control signals are masked from other stages thereof, and means for reading out information from the individual storage stages of a memory cell exhibiting a true comparison with the applied identification key signals.

* * * * *

UNITED STATES PATENT OFFICE
CERTIFICATE OF CORRECTION

Patent No. 3,646,528 Dated February 29, 1972

Inventor(s) Paul M. Davies

It is certified that error appears in the above-identified patent and that said Letters Patent are hereby corrected as shown below:

Cover Page, Column 1, Line 4 Delete "Manhattan Beach" and substitute --Newport Beach-- (Form PO-721 received by you on November 18, 1971)

Column 2, Line 25 Delete "performs" and substitute --perform--

Column 3, Lines 20 and 21 Delete "includes"

Column 8, Line 7 Delete "than" and substitute --that--

Column 9, Line 48 Delete "Flop" and substitute --flop--

Signed and sealed this 4th day of July 1972.

(SEAL)
Attest:

EDWARD M.FLETCHER,JR.
Attesting Officer

ROBERT GOTTSCHALK
Commissioner of Patents

ORM PO-1050 (10-69)

USCOMM-DC 60376-P69
U.S. GOVERNMENT PRINTING OFFICE : 1969 O—366-334